United States Patent
Na et al.

(10) Patent No.: US 10,491,259 B2
(45) Date of Patent: Nov. 26, 2019

(54) TERMINAL DEVICE AND METHOD FOR OPERATING TERMINAL DEVICE

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Min Soo Na, Seoul (KR); Tak Ki Yu, Seoul (KR); Dae Sik Hong, Seoul (KR); Han Ho Wang, Seongnam-si (KR); Kwon Jong Lee, Seoul (KR)

(73) Assignees: SK TELECOM CO., LTD., Seoul (KR); FOUNDATION YONSEI UNIVERSITY, Seoul (KR)

( * ) Notice: Subject to any disclaimer, the term of this patent is extended or adjusted under 35 U.S.C. 154(b) by 38 days.

(21) Appl. No.: 15/566,126

(22) PCT Filed: Feb. 24, 2016

(86) PCT No.: PCT/KR2016/001809
§ 371 (c)(1),
(2) Date: Oct. 12, 2017

(87) PCT Pub. No.: WO2016/167466
PCT Pub. Date: Oct. 20, 2016

(65) Prior Publication Data
US 2018/0091185 A1    Mar. 29, 2018

(30) Foreign Application Priority Data
Apr. 15, 2015    (KR) .......................... 10-2015-0053108

(51) Int. Cl.
*H04B 1/401*    (2015.01)
*H04B 17/373*    (2015.01)
(Continued)

(52) U.S. Cl.
CPC .......... *H04B 1/401* (2013.01); *H04B 17/373* (2015.01); *H04L 5/14* (2013.01); *H04W 72/121* (2013.01);
(Continued)

(58) Field of Classification Search
None
See application file for complete search history.

(56) References Cited

U.S. PATENT DOCUMENTS

2007/0002803 A1    1/2007  Destino et al.
2008/0240004 A1*  10/2008  Shaffer ................. H04J 3/0632
                                                                     370/296

(Continued)

FOREIGN PATENT DOCUMENTS

JP    2009535918 A    10/2009
KR    10-2013-0004509 A    1/2013
WO    2012/095683 A8    7/2012

OTHER PUBLICATIONS

The extended European Search Report for 167801893 dated Oct. 23, 2018.
(Continued)

*Primary Examiner* — Rebecca E Song
(74) *Attorney, Agent, or Firm* — Hauptman Ham, LLP

(57) ABSTRACT

Disclosed is a terminal device that is capable of taking an advantage of increasing transmission capacity in the FD transmission as much as possible by selectively using the FD transmission or the HD transmission in a multi-cell communication environment in consideration of a relationship with other neighboring nodes (base stations and terminals). Also disclosed is a method of operating the terminal device.

9 Claims, 5 Drawing Sheets

(51) Int. Cl.
*H04L 5/14* (2006.01)
*H04W 72/12* (2009.01)
*H04W 88/06* (2009.01)
*H04L 5/00* (2006.01)

(52) U.S. Cl.
CPC .......... *H04L 5/0044* (2013.01); *H04L 5/0053* (2013.01); *H04W 72/1289* (2013.01); *H04W 88/06* (2013.01)

(56) References Cited

U.S. PATENT DOCUMENTS

| | | | |
|---|---|---|---|
| 2009/0296609 A1 | 12/2009 | Choi et al. | |
| 2012/0063373 A1* | 3/2012 | Chincholi | H04L 5/001 370/281 |
| 2014/0226539 A1* | 8/2014 | McCoy | H04B 1/38 370/277 |
| 2015/0071062 A1 | 3/2015 | Cheng et al. | |
| 2016/0218850 A1* | 7/2016 | Gross | H04L 5/006 |
| 2016/0262114 A1* | 9/2016 | Chen | H04W 52/143 |

OTHER PUBLICATIONS

Riihonen et al., "Hybrid Full-Duplex/Half-Duplex Relaying with Transmit Power Adaptation", IEEE Transactions on Wireless Communications, Sep. 2111, pp. 3074-3085, vol. 10, No. 9.

Lee et al.,"Hybrid Full-/Half-Duplex System Analysis in Heterogeneous Wireless Networks", IEEE Transactions on Wireless Communications, May 2015, pp. 2883-2895, vol. 14, No. 5.

International Search Report dated May 25, 2016 corresponding to International Application No. PCT/KR2016/001809.

Japanese Office Action for corresponding Japanese application No. 2018-503443 dated Nov. 27, 2018.

* cited by examiner

TERMINAL DEVICE AND METHOD FOR OPERATING TERMINAL DEVICE

CROSS REFERENCE TO RELATED APPLICATION

This present application is a national stage filing under 35 U.S.C § 371 of PCT application number PCT/KR2016/001809 filed on Feb. 24, 2016 which is based upon and claims the benefit of priority to Korean Patent Application No. 10-2015-0053108 filed on Apr. 15, 2015 in the Korean Intellectual Property Office. The disclosures of the above-listed applications are hereby incorporated by reference herein in their entirety.

BACKGROUND OF THE INVENTION

1. Field of the Invention

The present disclosure relates to a terminal device. More specifically, the present disclosure relates to a terminal device that is capable of selectively using full-duplex (FD) transmission or half-duplex (HD) transmission in consideration of a relationship with other neighboring nodes (base stations and terminals) in a multi-cell communication environment in which multiple nodes coexist, and a method of operating the terminal device.

2. Description of the Prior Art

Recently, the demand for wireless traffic has continuously increased due to the development of wireless communication technology. Various technologies are emerging in order to meet the increasing demand for wireless traffic.

As one of the technologies, a Full-Duplex (FD) transmission technology has attracted attention. The FD transmission technology is capable of performing transmission and reception using one frequency/time resource in two nodes.

In the case of a Half-Duplex (HD) transmission, each node uses frequency and/or time resources separately for transmission and reception. In the case of FD transmission, however, two nodes use the same frequency/time resource at the same time for transmission and reception.

In the case of the FD transmission, the signal transmitted by the node itself acts as interference (hereinafter, "self-interference") when a signal transmitted from a counterpart node is received since the transmission and reception are simultaneously performed through the same frequency/time resource. In this case, the node can eliminate the self-interference due to the transmission signal at the time of signal reception by eliminating interference in an analog domain/a digital domain since the signal transmitted by the node itself is already known.

Due to this, when the self-interference is perfectly eliminated in the FD transmission, the FD transmission has an advantage of securing a resource usage rate up to 2 times higher than the HD transmission in the view point of two nodes.

However, when the FD transmission is applied to (used in) a multi-cell communication environment in which multiple nodes (e.g., multiple base stations and multiple terminals) coexist, uplink interference (hereinafter, referred to as "additional interference"), which is caused from a terminal of another base station, is added at the time of downlink, and downlink interference (hereinafter referred to as "additional interference"), which is caused from another base station, is additionally generated at the time of uplink.

In addition, since the additional interference causes a reduction in transmission capacity, a transmission capacity of the FD transmission can be less than a transmission capacity of the HD transmission due to the additional interference even though the resource usage rate increased up to two times using FD transmission.

Thus, the present disclosure provides a method of taking an advantage of increasing transmission capacity in FD transmission as much as possible by selectively using FD transmission or HD transmission in a multi-cell communication environment in consideration of a relationship with other neighboring nodes (base stations and terminals) that are associated with an additional interference generation.

SUMMARY OF THE INVENTION

The present disclosure provides a terminal device that is capable of taking an advantage of increasing transmission capacity in the FD transmission as much as possible by selectively using the FD transmission or the HD transmission in a multi-cell communication environment in consideration of a relationship with other neighboring nodes (base stations and terminals). The present disclosure also provides a method of operating the terminal device.

According to an embodiment of the present disclosure, a terminal device includes: a signal reception unit configured to receive a reference signal for full-duplex (FD) transmission; an interference node selection unit configured to select a specific interference node that has a maximum interference among interference nodes that interfere with the terminal device based on the reference signal; an estimation unit configured to estimate a transmission capacity of a full-duplex (FD) transmission mode and a transmission capacity of a half-duplex (HD) transmission mode based on a signal intensity of the reference signal received from the specific interference node; and a mode determination unit configured to determine whether to operate in the FD transmission mode based on the transmission capacity of the FD transmission mode and the transmission capacity of the HD transmission mode.

Specifically, the interference node may include an adjacent base station placed adjacent to a serving base station of the terminal device and terminals connected to the adjacent base station, and the specific interference node may be a terminal closest to the terminal device among the terminals.

Specifically, the mode determination unit may determine that the terminal device operates in a primary FD transmission mode when the transmission capacity of the FD transmission mode is greater than the transmission capacity of the HD transmission mode by a preset first threshold or more.

Specifically, when the transmission capacity of the FD transmission mode is not greater than the transmission capacity of the HD transmission mode by the preset first threshold or more, the mode determination unit may determine that the terminal device operates in an HD/FD transmission dual mode in which whether to operate in a secondary FD transmission mode is determined while operating in the HD transmission mode.

Specifically, the mode determination unit may determine that the terminal device operates in a primary FD transmission mode or operates in the HD/FD transmission dual mode at every preset first period.

Specifically, the mode determination unit may determine whether to operate the secondary full-duplex transmission mode every preset second period while the operation of the HD/FD transmission dual mode is maintained.

Specifically, the estimation unit re-estimates the transmission capacity of the FD transmission mode and the transmission capacity of the HD transmission mode based on the signal intensity of a reference signal received from a specific interference node through an uplink resource while the operation of the HD transmission mode is maintained. The mode determination unit may determine that the terminal device operates in the secondary FD transmission mode when the re-estimated transmission capacity of the FD transmission mode is greater than the re-estimated transmission capacity of the HD transmission mode by a preset second threshold or more.

According to an embodiment of the present disclosure, a method of operating a terminal device includes: a signal reception step of receiving a reference signal for full-duplex (FD) transmission; an interference node selection step of selecting a specific interference node that has a maximum interference among interference nodes that interfere with the terminal device based on the reference signal; an estimation step of estimating a transmission capacity of a full-duplex (FD) transmission mode and a transmission capacity of a half-duplex (HD) transmission mode based on signal intensity of the reference signal received from the specific interference node; and a mode determination step of determining whether to operate in the FD transmission mode based on the transmission capacity of the FD transmission mode and the transmission capacity of the HD transmission mode.

Specifically, the mode determination step may include determining that the terminal device operates in a primary FD transmission mode when the transmission capacity of the FD transmission mode is greater than the transmission capacity of a HD transmission mode by a preset first threshold or more.

Specifically, when the transmission capacity of the FD transmission mode is not greater than the transmission capacity of the HD transmission mode by the preset first threshold or more, the mode determination step may include determining that the terminal device operates in an HD/FD transmission dual mode in which whether to operate in a secondary FD transmission mode is determined while operating in the HD transmission mode.

Specifically, the mode determination step may include determining that the terminal device operates in a primary FD transmission mode or operates in the HD/FD transmission dual mode at every preset first period.

According to a terminal device of the present disclosure and a method of operating the terminal device, it is possible to take an advantage of increasing the transmission capacity in the FD transmission as much as possible by selectively using the FD transmission or the HD transmission in a multi-cell communication environment in consideration of a relationship with other neighboring nodes (base stations and terminals).

DETAILED DESCRIPTION OF THE EXEMPLARY EMBODIMENTS

Hereinafter, embodiments of the present disclosure will be described with reference to the accompanying drawings.

Figure 1:
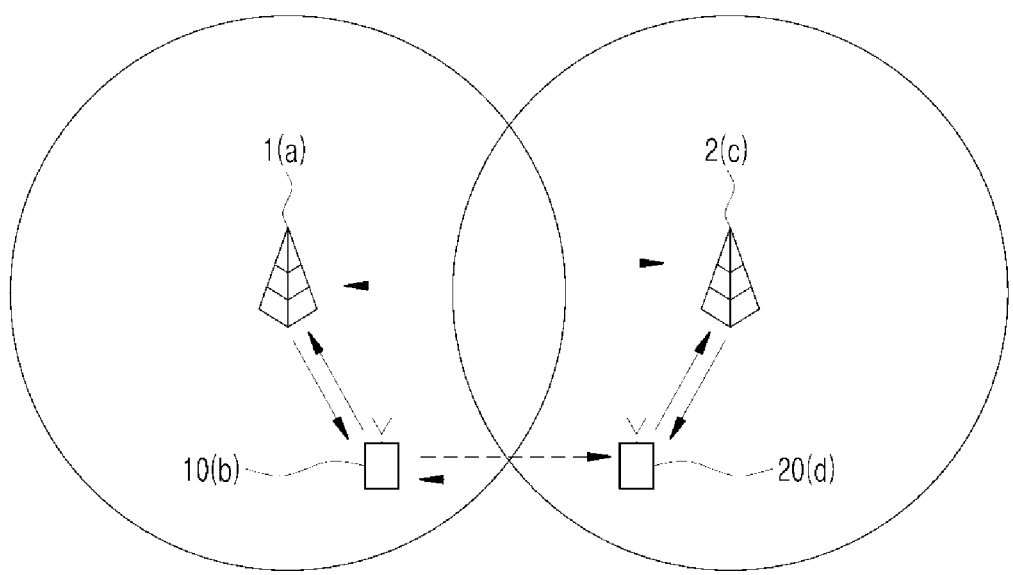
FIG. 1 is an exemplary view of a multi-cell communication environment in which the generation of additional interference due to FD transmission is illustrated.

FIG. 1 illustrates a multi-cell communication environment to which the present disclosure is applied.

FIG. 1 illustrates a case in which two base stations are provided and one terminal is connected to each of two base stations. However, this is merely an embodiment provided for the convenience of explanation.

The present disclosure may also be applied to a multi-cell communication environment in which more base stations and terminals exist.

Each terminal illustrated in FIG. 1 collectively refers to a mobile or stationary user node, such as a User Equipment (UE) and a Mobile Station (MS).

Each base station illustrated in FIG. 1 collectively refers to network nodes that communicate with a terminal, such as a node B, an e-node B, a base station, and an access point.

In the HD transmission technology, each node separately uses frequencies and/or time resources for transmission and reception.

When the HD transmission is applied (used) in the multi-cell communication environment illustrated in FIG. 1, frequencies and/or time resources are divided into a downlink resource and an uplink resource. Signals transmitted from each of the base stations 1 and 2 are received by each of the terminals 10 and 20 through a downlink resource, and signals transmitted from each of the terminals 10 and 20 are received by each of the base stations 1 and 2 through an uplink resource.

Thus, in the case where the HD transmission is applied in the multi-cell communication environment illustrated in FIG. 1, when both of the terminals 10 and 20 operate in the HD transmission, the sum of the uplink and downlink transmission capacities of the base stations 1 and 2 may be represented by $C_{HH,1}$ and $C_{HH,2}$ in Equation 1 as follows.

$$C_{HH,1} = \frac{1}{2} w \log_2\left(1 + \frac{P_{a,b}}{N_o + P_{c,b}}\right) + \frac{1}{2} w \log_2\left(1 + \frac{P_{b,a}}{N_o + P_{d,a}}\right) \quad \text{Equation 1}$$

$$C_{HH,2} = \frac{1}{2} w \log_2\left(1 + \frac{P_{c,d}}{N_o + P_{a,d}}\right) + \frac{1}{2} w \log_2\left(1 + \frac{P_{d,c}}{N_o + P_{b,c}}\right)$$

Here, "$P_{x,y}$" represents the signal intensity of a signal, which is transmitted by "x" and received by "y", and as illustrated in FIG. 1, "a" indicates the base station 1, "b" indicates the terminal 10, "c" indicates the base station 2, and "d" indicates the terminal 20. Further, "$N_o$" represents a white noise, and "w" represents the bandwidth allocated to the system during FD transmission.

On the other hand, the FD transmission technique is a method in which respective nodes simultaneously use the same frequency/time resource for signal transmission and reception.

That is, when the FD transmission is applied (used) in the multi-cell communication environment illustrated in FIG. 1, the base station 1 and the terminal 10 simultaneously use the same frequency/time resource for mutually transmitting and receiving signals, and the base station 2 and the terminal 20 simultaneously use the same frequency/time resource for mutually transmitting and receiving signals.

Thus, when the FD transmission is applied in the multi-cell communication environment illustrated in FIG. 1, the sum of the uplink and downlink transmission capacities of the base stations 1 and 2 when both of the terminals 10 and 20 operates in the FD transmission may be represented by $C_{FF,1}$ and $C_{FF,2}$ in Equation 2 as follows.

$$C_{FF,1} = \begin{array}{l} w\log_2\left(1 + \dfrac{P_{a,b}}{N_o + P_{c,b} + P_{d,b}}\right) + \\ w\log_2\left(1 + \dfrac{P_{b,a}}{N_o + P_{c,a} + P_{d,a}}\right) \end{array}$$

$$C_{FF,2} = \begin{array}{l} w\log_2\left(1 + \dfrac{P_{c,d}}{N_o + P_{a,d} + P_{b,d}}\right) + \\ w\log_2\left(1 + \dfrac{P_{d,c}}{N_o + P_{b,c} + P_{a,c}}\right) \end{array}$$

Equation 2

In the case of the FD transmission, the signals transmitted by a node (a base station, a terminal) acts as interference (hereinafter, "self-interference") for a signal received from a counterpart node (a terminal, a base station), since the transmission and reception are simultaneously performed through the same frequency/time resource. In this case, the node can eliminate the self-interference due to the transmission signal at the time of signal reception by eliminating interference in an analog domain/a digital domain, since the signal transmitted by the node is already known.

Due to this, when the self-interference is perfectly eliminated, FD transmission has an advantage of securing a resource usage rate up to 2 times higher than the HD transmission for mutually connected nodes (base stations and terminals).

However, when the FD transmission is applied (used) in a multi-cell communication environment in which a plurality of nodes (base stations and terminals) coexist, a new type of additional interference occurs because uplink and downlink coexist in the same frequency/time resource.

That is, when the FD transmission is applied (used) a multi-cell communication environment, uplink interference (hereinafter, referred to as "additional interference"), which is caused from a terminal of another base station, may be additionally generated during downlink, and downlink interference (hereinafter referred to as "additional interference"), which is caused from another base station, may be additionally generated during uplink.

For example, in the case where the FD transmission is applied in the multi-cell communication environment illustrated in FIG. 1, uplink interference (dotted line), which is caused from the terminal 20 of another base station 2, is generated in the terminal 10 as additional interference ("$P_{d,b}$" in Equation 2), and uplink interference (dotted line), which is caused from the terminal 10 of another base station 1, is generated in the terminal 20 as additional interference ("$P_{b,d}$" in Equation 2) for the downlink.

Further, downlink interference (dotted line) caused from another base station 2 is generated in the base station 1 as additional interference ("$P_{c,a}$" in Equation 2), and downlink interference (dotted line) caused from another base station 1 is generated in the base station 2 as additional interference ("$P_{a,c}$" in equation 2) for the uplink.

As described above, since additional interference $P_{d,b}$, $P_{c,a}$, $P_{b,d}$, or $P_{a,c}$ causes a reduction in transmission capacity, a transmission capacity of the FD transmission can be less than a transmission capacity of the HD transmission, even though the resource utilization rate increased up to two times using FD transmission.

Thus, the present disclosure proposes a method of taking an advantage of increasing transmission capacity in FD transmission as much as possible by selectively using FD transmission or HD transmission in consideration of a relationship with other neighboring nodes (base stations and terminals) that are associated with an additional interference generation in a multi-cell communication environment as illustrated in FIG. 1.

Hereinafter, a terminal device according to an embodiment for realizing the method proposed by the present disclosure will be described with reference to FIG. 2.

Figure 2:
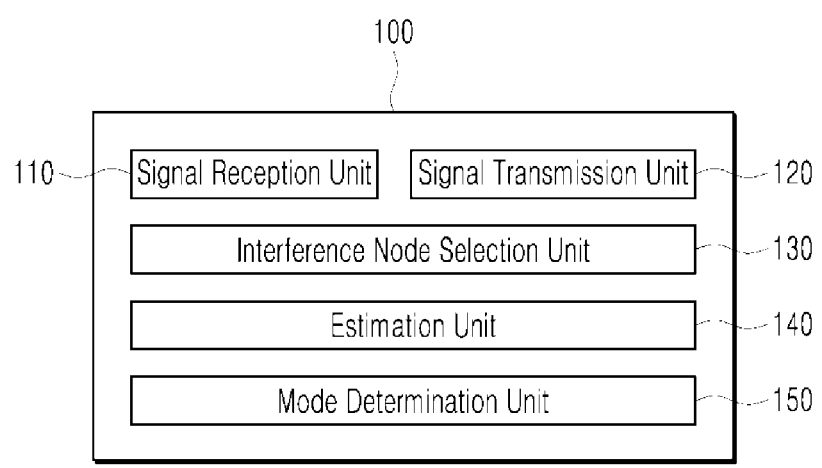
FIG. 2 is a block diagram specifically illustrating a configuration of a terminal device according to an embodiment of the present disclosure.

As illustrated in FIG. 2, a terminal device 100 according to an embodiment of the present disclosure includes: a signal reception unit 110 configured to receive a reference signal for full-duplex (FD) transmission; an interference node selection unit 130 configured to select a specific interference node that has a maximum interference among interference nodes that interfere with the terminal device 100 based on the reference signal; an estimation unit 140 configured to estimate transmission capacity of an FD transmission mode and transmission capacity of a half-duplex (HD) transmission mode based on signal intensity of the reference signal received from the specific interference node; and a mode determination unit 150 configured to determine whether to operate in the FD transmission mode based on the transmission capacity of the FD transmission mode and the transmission capacity of the HD transmission mode.

Here, the terminal device 100 of the present disclosure may be one of a plurality of terminals (e.g., the terminals 10 and 20) located in a multi-cell communication environment as illustrated in FIG. 1. Hereinafter, for the convenience of explanation, it is assumed that the terminal device 100 of the present disclosure is the terminal 10 of FIG. 1.

The terminal device 100 of the present disclosure is assumed to have a function of eliminating self-interference for FD transmission and a function of selectively using FD transmission or HD transmission.

Of course, the base stations 1 and 2 illustrated in FIG. 1 are also assumed to have a function of eliminating self-interference for FD transmission and a function of selectively using FD transmission or HD transmission.

The signal reception unit 110 receives a reference signal for FD transmission.

More specifically, the terminal device 100 of the present disclosure periodically repeats the operation of mutually transmitting and receiving a reference signal for FD transmission with other neighboring nodes.

At this time, the other neighboring nodes include not only a serving base station to which the terminal device 100 is connected, but also interference nodes that interfere with the terminal device 100.

The interference nodes that interfere with the terminal device 100 may mean a group of geographic locations of a base station and terminals connected to the base station located within a predetermined distance from the terminal device 100 to have a relatively large amount of interference to the terminal device 100.

This interference node may be defined according to a Signal-to-Interference Noise Ratio (SINR) required by the reception function and the transmission power of a transmission function in the terminal device 100.

For example, the interference node may be defined as an adjacent base station located adjacent to the serving base station of the terminal device 100 and a terminal connected to the adjacent base station.

Thus, in the case of the multi-cell communication environment illustrated in FIG. 1, the interference node of the terminal device 100 may be an adjacent base station 2 located adjacent to the serving base station 1 of the terminal device 100 (the same as the terminal 10) and a terminal 20 connected to the adjacent base station 2.

Hereinafter, the base station 2 and the terminal 20 will be described as the interference nodes of the terminal device 100 for the convenience of explanation.

The terminal device 100 of the present disclosure is basically synchronized with the serving base station 1. The terminal device 100 periodically repeats the operation of synchronizing with the interference nodes, that is, the adjacent base station 2 and the terminal 20.

For the operation of synchronizing, a synchronization maintenance method used in terminal-to-terminal (D2D (Device-to-Device)) communication and an inter-base station synchronization maintenance method used in CoMP (Coordinated Multi-Point) or the like may be used.

In addition, on the assumption that the terminal device is also synchronized with the interference nodes (adjacent base station 2 and terminal 20), the terminal device 100 of the present disclosure periodically repeats the operation of mutually transmitting and receiving a reference signal for FD transmission with each of the serving base station 1, the adjacent base station 2, and the terminal 20.

Hereinafter, a frame structure of a transmission end and a reception end will be described in the process of transmitting/receiving a reference signal for FD transmission with reference to FIG. 3.

At this time, the transmission end may refers to a unit for a signal transmission function in the terminal device 100, i.e., the signal transmission unit 120 in FIG. 2, and the reception end may refer to a unit for signal for a signal reception function in the terminal device 100, i.e. a signal reception unit 110 in FIG. 2.

Figure 3:
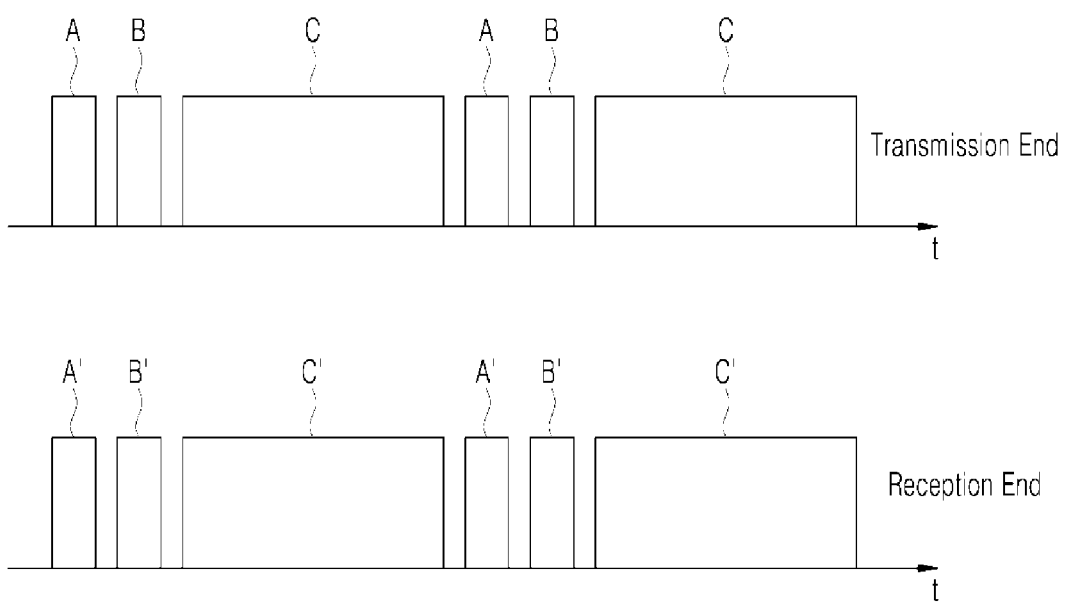
FIG. 3 is an exemplary view illustrating a frame structure of a transmission terminal/reception terminal proposed for FD transmission in the present disclosure.

As illustrated in FIG. 3, a frame transmitted from the transmission end, i.e. the signal transmission unit 120, has a structure that includes sections A in which a self-interference channel reference signal is transmitted so as to measure its own self-interference channel, sections B in which a transmission channel reference signal is transmitted for signal reception by a reception side node, and FD data transmission sections C.

At the same time, a frame received by the reception end, i.e. the signal reception unit 110, has a structure that includes sections A' in which the self-interference channel reference signal is received to measure a self-interference channel, sections B' in which the transmission channel reference signal transmitted from a transmission side node is received to measure a reception channel, and an FD data reception section C'.

At this time, a reference signal transmitted from one transmission end may utilize codes having a mutually orthogonal characteristic or codes having pseudo-random characteristics so as to be distinguished from a reference signal transmitted from another transmission end.

Accordingly, the transmission end and the reception end, that is, the signal transmission unit 120 and the signal reception unit 110 may perform FD data transmission C and FD data reception C' based on channel information collected through a series of above-mentioned sections A, A', B, and B'.

Thus, the signal reception unit 110 may receive a reference signal for FD transmission, which is periodically and repeatedly transmitted from other neighboring nodes, that is, the serving base station 1, the adjacent base station 2, and a terminal 20.

The interference node selection unit 130 selects a specific interference node that has the highest interference among the interference nodes that interfere with the terminal device 100, based on a reference signal (in particular, a transmission channel reference signal) received through the signal reception unit 110.

At this time, it is desirable that the specific interference node is a terminal that is located closest to the terminal device 100 among the terminals belonging to the interference nodes of the terminal device 100.

For example, the interference node selection unit 130 may compare the signal intensities of the reference signals received from the terminals belonging to the interference nodes based on the reference signals received via the signal reception unit 110, and may select a terminal having the highest signal intensity as the terminal that is located closest to the terminal device 100, that is, a specific interference node.

Hereinafter, for the convenience of explanation, the terminal 20 will be described as the specific interference node.

The estimation unit 140 may estimate the transmission capacity of an FD transmission mode (hereinafter, referred to as "FD mode transmission capacity") and the transmission capacity of an HD transmission mode (hereinafter, referred to as "HD mode transmission capacity") based on the signal intensities of the reference signals received from the specific interference node, i.e. the terminal 20.

More specifically, the estimation unit 140 may estimate the FD mode transmission capacity and the HD mode transmission capacity used for calculating a cost function $\Gamma$ as represented in the following Equation 3.

$$\Gamma = \log_2\left(1 + \frac{P_{BS}}{\sum_i P_i + P_{target} + N_o}\right) - \alpha\log_2\left(1 + \frac{P_{BS}}{\sum_i P_i + N_o}\right) \quad \text{Equation 3}$$

"$P_{BS}$" represents the signal intensity of a reference signal received from the serving base station 1 by the terminal device 100, and "$P_{target}$" represents the signal intensity of a reference signal received from the specific interference node, i.e. the terminal 20. In addition, $$"\sum_i P_i"$$

is defined as the total sum of the signal intensities of the reference signals received the interference nodes, excluding the serving base station (1) and the specific interference node, i.e. the terminal 20. "$\alpha$" is defined as a preset coefficient (e.g., ½) that is set in advance in consideration of a difference between FD mode transmission capacity and HD mode transmission capacity.

In Equation 3, the first log term refers to FD mode transmission capacity estimated by the estimation unit 140. In other word, the first log term refers to a portion for estimating a situation in which additional interference to interfere with another terminal exists when the terminal device 100 operates in the FD transmission mode.

In Equation 3, the second log term refers to HD mode transmission capacity estimated by the estimation unit 140. In other word, the second log term refers to a portion for estimating a situation in which additional interference to interfere with another terminal does not exist when the terminal device 100 operates in the HD transmission mode.

The mode determination unit 150 determines whether to operate in the FD transmission mode based on the FD mode transmission capacity and the HD mode transmission capacity.

More specifically, based on the FD mode transmission capacity and the HD mode transmission capacity estimated by the estimation unit 140, when the FD mode transmission capacity is greater than the HD mode transmission capacity by a preset first threshold or more, the mode determination unit 150 may determine that the terminal device operates in a primary FD transmission mode (hereinafter, a "primary FD mode").

Meanwhile, based on the FD mode transmission capacity and the HD mode transmission capacity estimated by the estimation unit 140, when the FD mode transmission capacity is not greater than the HD mode transmission capacity by the first threshold or more, the mode determination unit 150 may determine that the terminal device operates in an HD/FD transmission dual mode (hereinafter, referred to as an "HD/FD dual mode") in which it is determined whether to operate in a secondary FD transmission mode (hereinafter, referred to as a "secondary FD mode") while operating in the HD mode.

In addition, the mode determination unit 150 may preferably determine whether to operate in the first FD mode or in the HD/FD dual mode depending on whether or not the FD mode transmission capacity is greater than the HD mode transmission capacity by the first threshold or more at every preset first period (T1).

Figure 4:
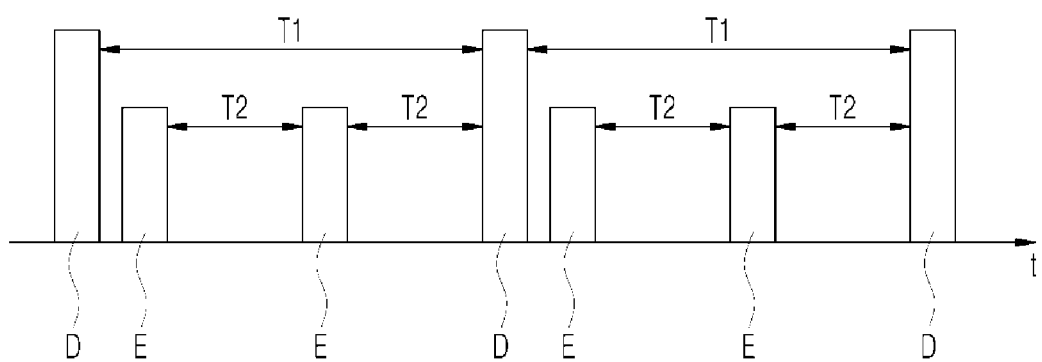
FIG. 4 is an exemplary view for explaining in comparison a primary FD transmission mode and a secondary FD transmission mode in the present disclosure.

Referring to FIG. 4, the mode determination unit 150 determines whether to operate in the primary FD mode or in the HD/FD dual mode in a primary decision period (D) that comes in at every first period (T1).

Here, when the FD mode transmission capacity is greater than the HD mode transmission capacity by the first threshold or more, the cost function $\Gamma$ calculated according to Equation 3 described above will be greater than the first threshold, which means that the FD mode is advantageous than the HD transmission in terms of the total transmission capacity despite additional interference.

In addition, whether the cost function $\Gamma$ is greater or less than the first threshold is closely related to a relationship between the terminal device 100 and other neighboring nodes, especially a distance between the terminal device 100 and interference nodes (a base station 2, a terminal 20, etc.).

Thus, the mode determination unit 150 may determine that the terminal device operates in the first FD mode when the cost function $\Gamma$ calculated according to Equation 3 described above is greater than the first threshold.

In this case, the terminal device 100 of the present disclosure operates in the FD mode from a time point where the mode determination unit 150 determines that the terminal device 100 operates in the primary FD mode, and notifies the serving base station 1 that the terminal device 100 operates in the FD mode.

At this time, the first threshold may be set by the terminal device 100 or the base station 1. Setting the first threshold to a large value is to lower the possibility of operating in the FD mode, and the opposite case is to increase the possibility of operating in the FD mode.

Meanwhile, when the FD mode transmission capacity is not greater than the HD mode transmission capacity by the first threshold or more, the cost function $\Gamma$ calculated according to Equation 3 described above will be smaller than the first threshold, which means that the FD mode is disadvantageous than the HD transmission in terms of the total transmission capacity due to additional interference.

Thus, the mode determination unit 150 may determine that the terminal operates in the HD/FD dual mode when the cost function $\Gamma$ calculated according to Equation 3 described above is smaller than the first threshold.

In this case, the terminal device 100 of the present disclosure operates in the HD/FD dual mode in which it is continuously determined whether to operate in the secondary FD mode while operating in the HD mode, from a time point where the mode determination unit 150 determines that the terminal device 100 operates in the HD/FD dual mode.

Hereinafter, a detailed description will be made of the case where the terminal device 100 of the present disclosure operates in the HD/FD dual mode, that is, the case where the mode determination unit 150 determines that the terminal device operates in the HD/FD dual mode.

The HD/FD dual mode is a mode that is based on the HD mode operation, and is capable of switching the operation to the secondary FD mode in accordance with a relationship with neighboring nodes, especially an interference change with interference nodes (the base station 2, the terminal 20, etc.).

Thus, when the mode determination unit 150 determines that the terminal device 100 operates in the HD/FD dual mode, the operation of the HD/FD dual mode is based on the HD mode, and as a result, the terminal device 100 operates in the HD mode.

In addition, the mode determination unit 150 determines whether to operate in the secondary FD mode at every preset second period T2 while the HD/FD dual mode operation is maintained.

As described above, when the terminal device 100 operates in the HD mode, the terminal device 100 divides the frequency and/or time resources into downlink resource and uplink resource, receives a signal through a downlink resource, and transmits a signal through an uplink resource.

Thus, the estimation unit 140 preferably re-estimates the FD mode transmission capacity and the HD mode transmission capacity by measuring (observing) an interference change with the interference nodes (the base station 2, the terminal 20, etc.) using an uplink resource while the HD mode operation is maintained.

That is, while the HD mode operation is maintained, the estimation unit 140 may re-estimate the FD mode transmission capacity and the HD mode transmission capacity based on the signal intensity of the reference signal received from the specific interference node, i.e., the terminal 20, through the uplink resource.

More specifically, the estimation unit 140 may re-estimate the FD mode transmission capacity and the HD mode transmission capacity used for calculating a cost function $\Gamma$ as represented in Equation 3 described above.

In this re-estimation, "$P_{BS}$" represents the signal intensity of a reference signal received from the serving base station 1 by the terminal device 100 through a downlink resource, "$P_{target}$" represents the signal intensity of a reference signal received from a specific interference node, i.e. the terminal 20 through the uplink resource, and $$"\sum_i P_i"$$

represents total sum of the signal intensities of the reference signals received through the uplink resource from interference nodes excluding the serving base station 1 and the specific interference node, i.e. the terminal 20.

Thus, when the FD mode transmission capacity re-estimated by the estimation mode 140 while the HD mode operation is maintained is greater than the HD mode transmission capacity re-estimated by the estimation unit 140 by a second threshold or more, the mode determination unit 150 may determine that the terminal device operates in the secondary FD transmission mode.

That is, when the cost function $\Gamma$ calculated based on the FD mode transmission capacity and the HD mode transmission capacity re-estimated by the estimation unit 140 while the HD mode operation is maintained is greater than the second threshold, the mode determination unit 150 may determine that the terminal device operates in the secondary FD transmission mode, and when the cost function $\Gamma$ smaller than the second threshold, the mode determination unit 150 may determine that the terminal device maintains (or return to) the HD mode operation as the basic mode.

Referring to FIG. 4, a description will be made assuming that it is determined that the terminal device operates in the HD/FD dual mode. The mode determination unit 150 determines whether to operate in the HD or to operate in the secondary FD mode in a secondary determination section E which comes at every second period (T2) during the operation in the HD/FD dual mode (during T1).

Thus, during operation in the HD/FD dual mode, the terminal device 100 operates in the HD mode or in the secondary FD mode depending on whether the terminal device 100 operates in the secondary FD mode, which is determined by the mode determination unit 150 at every second period T2, and notifies the serving base station 1 whether the terminal device 100 is operating in the HD mode or in the secondary FD mode.

As described above, in a multi-cell communication environment in which a plurality of nodes (base stations, terminals) coexist, the terminal device according to an embodiment of the present disclosure may estimate FD mode transmission capacity and HD mode transmission capacity and selectively operate in an advantageous mode in terms of transmission capacity based on the estimation in consideration of relationships (e.g., a distance and an interference change) with other neighboring nodes (base stations and terminals) associated with an additional interference generation environment due to the FD transmission.

Consequently, with a terminal device according to an embodiment of the present disclosure, it is possible to take an advantage of increasing transmission capacity in FD transmission as much as possible by selectively using FD transmission or HD transmission in a multi-cell communication environment in consideration of a relationship (a distance or an interference change) with other neighboring nodes (base stations and terminals).

Figure 5:
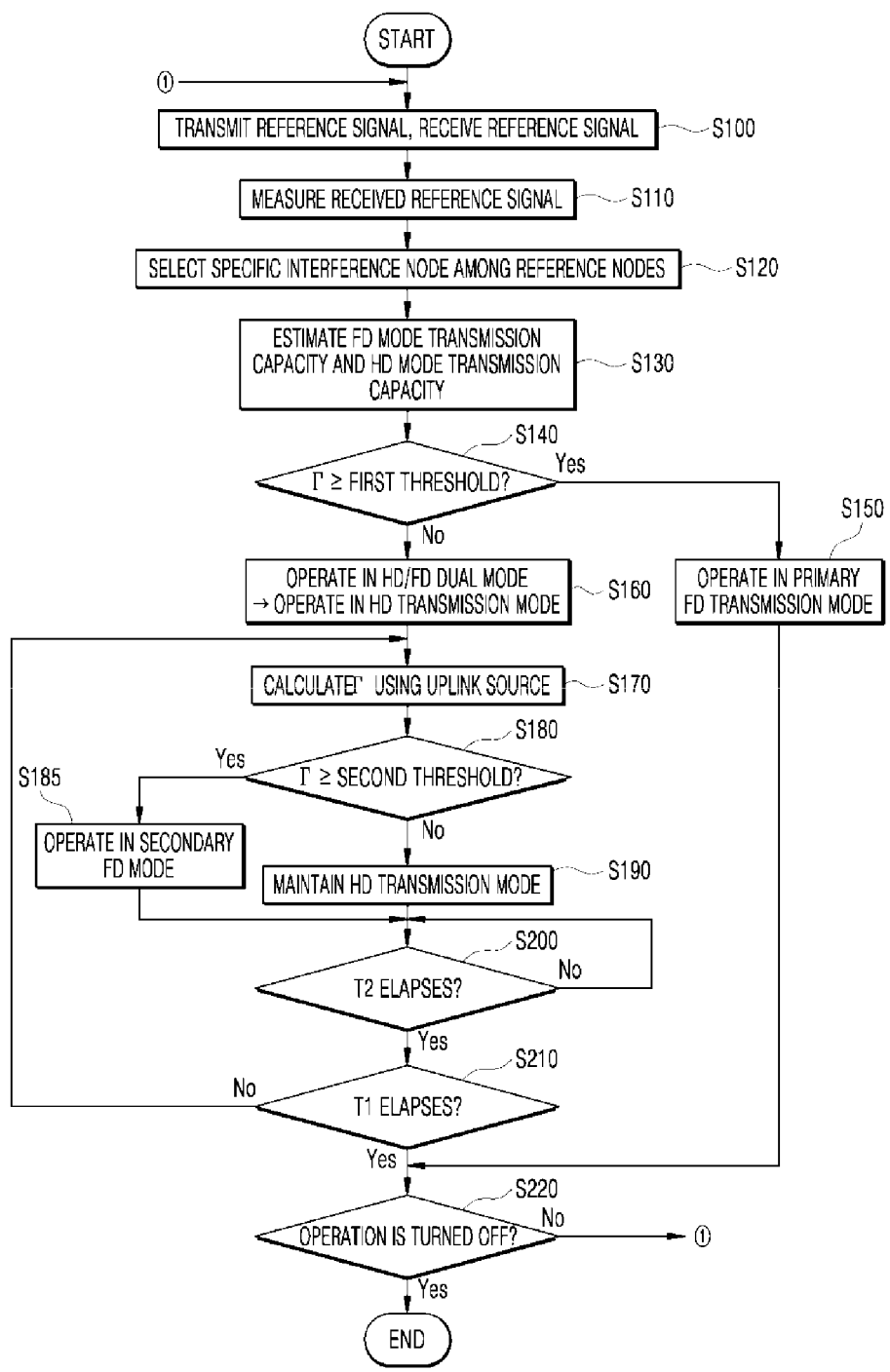
FIG. 5 is a flowchart illustrating a method of operating a terminal device according to an embodiment of the present disclosure.

Hereinafter, a method of operating a terminal device according to an embodiment of the present disclosure will be described with reference to FIG. 5.

For the convenience of explanation, the terminal device 100 will be described as in the above-described embodiment, and descriptions will be made while referring to the reference numerals in FIGS. 1 to 4.

The method of operating the terminal device 100 of the present disclosure periodically repeats the operation of mutually transmitting and receiving a reference signal for FD transmission with other neighboring nodes (S100).

At this time, the other neighboring nodes include not only a serving base station to which the terminal device 100 is connected, but also interference nodes that interfere with the terminal device 100.

For example, in the case of the multi-cell communication environment illustrated in FIG. 1, the neighboring other nodes of the terminal device 100 (the same as the terminal 10) may be a serving base station 1 and interference nodes. At this time, the interference nodes may be an adjacent base station 2 located adjacent to the serving base station 1 and a terminal 20 connected to the adjacent base station 2.

Hereinafter, the base station 2 and the terminal 20 will be described as the interference nodes of the terminal device 100 for the convenience of explanation.

In addition, the method of operating the terminal device 100 according to an embodiment of the present disclosure periodically repeats the operation of mutually transmitting and receiving a reference signal for FD transmission with each of the serving base station 1, the adjacent base station 2, and the terminal 20 on the assumption that the terminal device 100 is also synchronized with each of the serving base station 1, the adjacent base station 2, and the terminal 20.

The method of operating the terminal device 100 according to an embodiment of the present disclosure measures the signal intensity of each of the received reference signals (in particular, transmission channel reference signals) (S110).

In addition, the method of operating the terminal device 100 according to an embodiment of the present disclosure selects a specific interference node having the maximum interference among the interference nodes that interfere with the terminal device 100 (S120).

For example, the method of operating the terminal device 100 according to an embodiment of the present disclosure may select a terminal having the highest signal intensity among the terminals belonging to the interference nodes, as a terminal having the closest distance to the terminal device 100, based on reference signals received and measured through steps S100 and S110 (in particular, transmission channel reference signals).

Hereinafter, for the convenience of explanation, the terminal 20 will be described as the specific interference node.

Hereinafter, the method of operating the terminal device 100 according to an embodiment of the present disclosure may estimate the transmission capacity of an FD transmission mode (hereinafter, referred to as "FD mode transmission capacity") and the transmission capacity of an HD transmission mode (hereinafter, referred to as "HD mode transmission capacity") based on the signal intensities of the reference signals received from the specific interference node, i.e. the terminal 20 (S130).

More specifically, the method of operating the estimation unit 100 according to an embodiment of the present disclosure may estimate the FD mode transmission capacity and the HD mode transmission capacity used for calculating a cost function $\Gamma$ as represented in Equation 3 described above.

Accordingly, the method of operating the terminal device 100 according to an embodiment of the present disclosure determines whether the cost function $\Gamma$ calculated based on the FD mode transmission capacity and the HD mode transmission capacity is greater than the first threshold (S140).

When the cost function $\Gamma$ is greater than the first threshold (S140, Yes), the method of operating the terminal device 100 according to an embodiment of the present disclosure may determine that the terminal device operates in a primary FD transmission mode (hereinafter, referred to as a "primary FD mode") (S150).

In this case, the method of operating the terminal device 100 according to an embodiment of the present disclosure causes the terminal device 100 to operate in the FD mode from a time point where it is determined that the terminal device 100 operates in the primary FD transmission mode in step S150, and notifies the serving base station 1 that the terminal device 100 operates in the FD mode.

Meanwhile, when the cost function $\Gamma$ is smaller than the first threshold (No in S140), the method of operating the terminal device 100 according to an embodiment of the present disclosure may determine that the terminal device 100 operates in an HD/FD transmission mode (hereinafter, referred to as an "HD/FD dual mode") (S160).

In this case, the method of operating the terminal device 100 of the present disclosure causes the terminal device 100 to operate in the HD/FD dual mode in which it is continuously determined whether to operate in the secondary FD mode while operating in the HD mode, from a time point where it is determined that the terminal device 100 operates in the HD/FD dual mode in step S160.

In addition, the method of operating the terminal device 100 according to an embodiment of the present disclosure may preferably repeat the steps required in the process of determining whether to cause the terminal device 100 in the primary FD mode or in the HD/FD dual mode (S100 to S140) as described above at every time point where the first period T1 elapses (S210 Yes) and as long as the operation of the terminal device 100 is not turned off (S220 No. ①).

Hereinafter, a detailed description will be made of the case where the terminal device 100 according to an embodiment of the present disclosure operates in the HD/FD dual mode, that is, the case where it is determined that the terminal device 100 operates in the HD/FD dual mode in step S160.

The method of operating the terminal device 100 according to an embodiment of the present disclosure is based on the HD mode operation when it is determined that the terminal device 100 operates in the HD/FD dual mode is determined (S160), and as a result, causes the terminal device 100 to operate in the HD mode.

As described above, when the terminal device 100 operates in the HD mode, the terminal device 100 divides the frequency and/or time resources into downlink source and uplink source, receives a signal through a downlink resource, and transmits a signal through an uplink resource.

Thus, in the method of operating the terminal device 100 according to an embodiment of the present disclosure, the FD mode transmission capacity and the HD mode transmission capacity are preferably re-estimated by measuring (observing) an interference change with the interference nodes (the base station 2, the terminal 20, etc.) using an uplink resource while the HD mode operation is maintained.

That is, in the method of operating the terminal device 100 according to an embodiment of the present disclosure, while the HD mode operation is maintained, the FD mode transmission capacity and the HD mode transmission capacity may be re-estimated based on the signal intensity of the reference signal received from the specific interference node, i.e., the terminal 20, through the uplink resource.

In addition, the method of operating the terminal device 100 according to an embodiment of the present disclosure calculates a cost function $\Gamma$ of Equation 3 based on the FD mode transmission capacity and HD mode transmission capacity re-estimated using the uplink source as described above (S170).

Accordingly, the method of operating the terminal device 100 according to an embodiment of the present disclosure determines whether the cost function $\Gamma$ calculated based on the re-estimated FD mode transmission capacity and HD mode transmission capacity is greater than the second threshold (S180).

When the cost function $\Gamma$ is greater than the second threshold (S180 Yes), the method of operating the terminal device 100 according to an embodiment of the present disclosure may determine that the terminal device 100 operates in a secondary FD transmission mode (hereinafter, referred to as a "secondary FD mode") (S185), and when the cost function $\Gamma$ is smaller than the second threshold, the method may determine that the terminal device 100 maintains (or returns to) the HD mode operation which is a basic mode (S190).

In addition, the method of operating the terminal device 100 according to an embodiment of the present disclosure preferably repeats the steps required in the process of determining whether to cause the terminal device 100 to operate in the HD mode or in the secondary FD mode while the HD/FD dual mode operation is maintained as described above (S170 to S180) at every time point where the first period T2 elapses (S200, Yes) and as long as the first period T1 does not elapses (S210, No).

Thus, in the method of operating the terminal device 100 according to an embodiment of the present disclosure, during operation in the HD/FD dual mode, the terminal device 100 operates in the HD mode or in the secondary FD mode depending on whether the terminal device 100 operates in the secondary FD mode, which is determined at every second period T2, and notifies the serving base station 1 whether the terminal device 100 is operating in the HD mode or in the secondary FD mode.

As described above, according to the method of operating the terminal device according to an embodiment of the present disclosure, in a multi-cell communication environment in which a plurality of nodes (base stations, terminals) coexist, the terminal device may estimate FD mode transmission capacity and HD mode transmission capacity and selectively operate in an advantageous mode in terms of transmission capacity based on the estimation in consideration of relationships (e.g., a distance and an interference change) with other neighboring nodes (base stations and terminals) associated with an additional interference generation environment due to the FD transmission.

Consequently, according to the method of operating the terminal device proposed by the present disclosure, it is possible to take an advantage of increasing transmission capacity in FD transmission as much as possible by selectively using FD transmission or HD transmission in a multi-cell communication environment in consideration of a relationship (a distance or an interference change) with other neighboring nodes (base stations and terminals) that are associated with an additional interference generation environment.

The operation method of the terminal device according to an embodiment of the present disclosure may be implemented in the form of program commands executable through various computer means and recorded in a computer readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A terminal device comprising a processor and a memory, wherein the processor is configured to:
   receive a reference signal for full-duplex (FD) transmission;
   select a specific interference node that has a maximum interference among interference nodes that interfere with the terminal device based on the reference signal;
   estimate a transmission capacity of an FD transmission mode and a transmission capacity of a half-duplex (HD) transmission mode based on a signal intensity of the reference signal received from the specific interference node; and
   determine whether to operate in the FD transmission mode based on the transmission capacity of the FD transmission mode and the transmission capacity of the HD transmission mode,
   wherein the processor is configured to determine that the terminal device operates in an HD/FD transmission dual mode when the transmission capacity of the FD transmission mode is not greater than the transmission capacity of the HD transmission mode by a preset first threshold or more, and
   wherein in the HD/FD transmission dual mode, it is determined whether to operate in a secondary FD transmission mode while operating in the HD transmission mode.

2. The terminal device of claim 1, wherein
   the interference nodes include an adjacent base station located adjacent to a serving base station of the terminal device and terminals connected to the adjacent base station, and
   the specific interference node is a terminal that is closest to the terminal device among the terminals.

3. The terminal device of claim 1, wherein the processor is configured to determine that the terminal device operates in a primary FD transmission mode when the transmission capacity of the FD transmission mode is greater than the transmission capacity of the HD transmission mode by the preset first threshold or more.

4. The terminal device of claim 1, wherein the processor is configured to determine that the terminal device operates in a primary FD transmission mode or an HD/FD transmission dual mode,
   wherein in the HD/FD transmission dual mode, it is determined whether to operate in a secondary FD transmission mode while operating in the HD transmission mode at every preset first period.

5. The terminal device of claim 1, wherein the processor is configured to determine whether to operate in the secondary FD transmission mode at every preset second period while the operation of the HD/FD transmission dual mode is maintained.

6. The terminal device of claim 1, wherein the processor is configured to re-estimate the transmission capacity of the FD transmission mode and the transmission capacity of the HD transmission mode based on the signal intensity of a reference signal received from a specific interference node through an uplink resource while the operation of the HD transmission mode is maintained, and
   the processor is configured to determine that the terminal device operates in the secondary FD transmission mode when the re-estimated transmission capacity of the FD transmission mode is greater than the re-estimated transmission capacity of the HD transmission mode by a preset second threshold or more.

7. A method of operating a terminal device having a processor and a memory, the method performed by the terminal device, the method comprising:
   receiving a reference signal for full-duplex (FD) transmission;
   selecting a specific interference node that has a maximum interference among interference nodes that interfere with the terminal device based on the reference signal;
   estimating a transmission capacity of an FD transmission mode and a transmission capacity of a half-duplex (HD) transmission mode based on a signal intensity of the reference signal received from the specific interference node; and
   determining whether to operate in the FD transmission mode based on the transmission capacity of the FD transmission mode and the transmission capacity of the HD transmission mode,
   wherein the determining whether to operate in the FD transmission mode includes determining that the terminal device operates in an HD/FD transmission dual mode when the transmission capacity of the FD transmission mode is not greater than the transmission capacity of the HD transmission mode by the preset first threshold or more,
   wherein in the HD/FD transmission dual mode, it is determined whether to operate in a secondary FD transmission mode while operating in the HD transmission mode.

8. The method of claim 7, wherein the determining whether to operate in the FD transmission mode includes determining that the terminal device operates in a primary FD transmission mode when the transmission capacity of the FD transmission mode is greater than the transmission capacity of the HD transmission mode by a preset first threshold or more.

9. The method of claim 7, wherein the determining whether to operate in the FD translation mode includes determining that the terminal device operates in a primary FD transmission mode or an HD/FD transmission dual mode at every preset first period, wherein in the HD/FD transmission dual mode, it is determined whether to operate in a secondary FD transmission mode while operating in the HD transmission mode.

\* \* \* \* \*